United States Patent

[11] 3,581,769

[72] Inventors Frank Haley
Upland;
Allan R. Bahlke, Fullerton, both of, Calif.
[21] Appl. No. 763,308
[22] Filed Sept. 27, 1968
[45] Patented June 1, 1971
[73] Assignee FMC Corporation
San Jose, Calif.

[54] POWERED BALANCE SYSTEM FOR A FLUID
TRANSFERRING APPARATUS
11 Claims, 4 Drawing Figs.
[52] U.S. Cl. .................................................. 137/615
[51] Int. Cl. ......................................................B65g 53/30,
F16l 27/00, F17d 1/00
[50] Field of Search........................................... 137/615

[56] References Cited
UNITED STATES PATENTS
3,085,593  4/1963  Sorensen.................. 137/615

Primary Examiner—William F. O'Dea
Assistant Examiner—William H. Wright
Attorneys—F. W. Anderson and C. E. Tripp ABSTRACT: A fluid transferring apparatus, of the marine loading arm variety, with an hydraulic-powered single-counterweighted system for balancing the apparatus and maneuvering it both horizontally and vertically. The apparatus is fully counterbalanced when it is filled with fluid, thereby imposing no load on the structure to which its outer end is connected during fluid transfer, and the power system provides positive control of the apparatus at all times, along with safeguards against accidents in the event of power and/or operator failure.

PATENTED JUN 1 1971
3,581,769
SHEET 1 OF 3
FIG_1
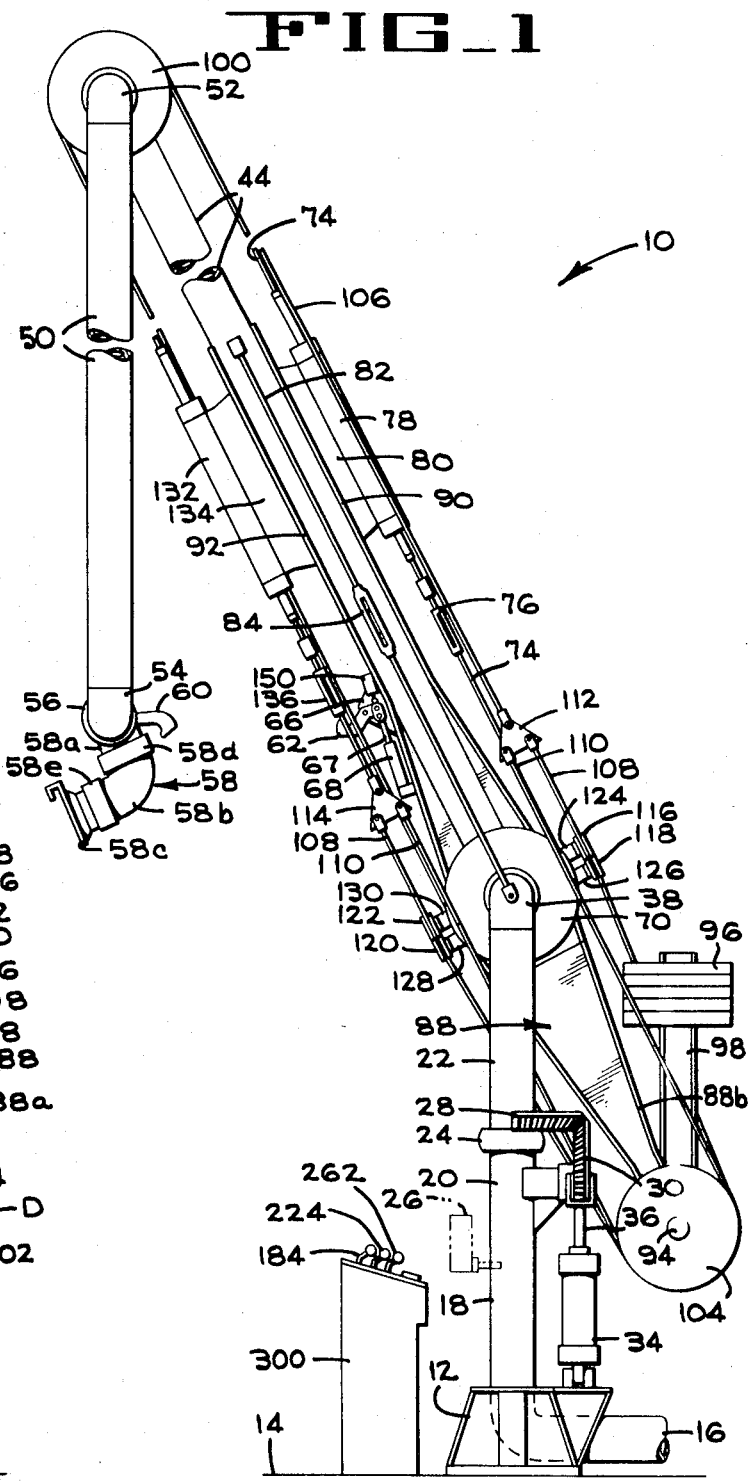
FIG_2
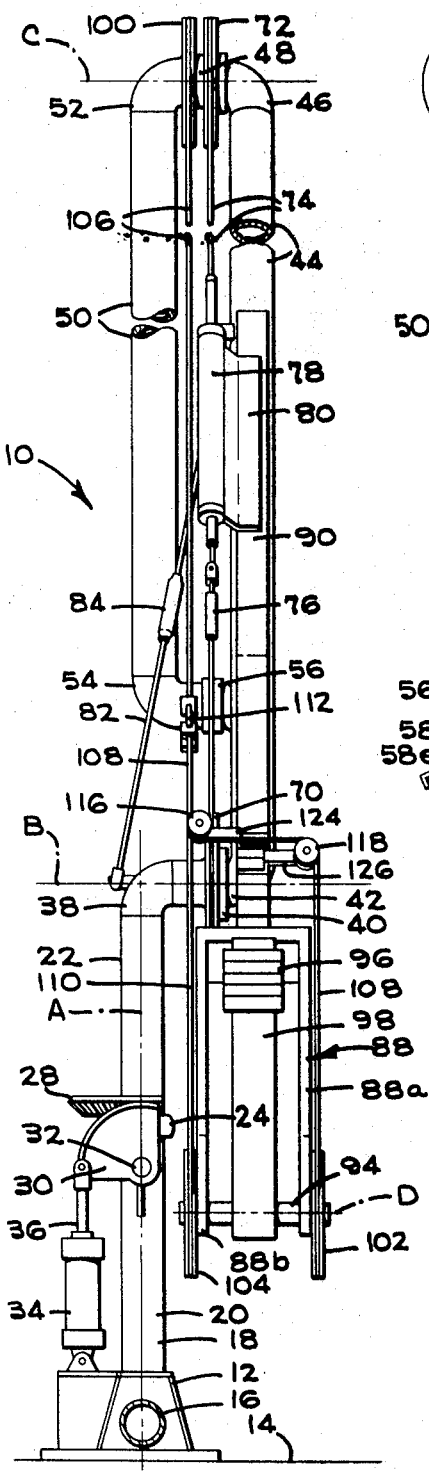
INVENTORS
FRANK HALEY
ALLAN R. BAHLKE
BY F. W. Anderson
C. E. Tripp
ATTORNEYS

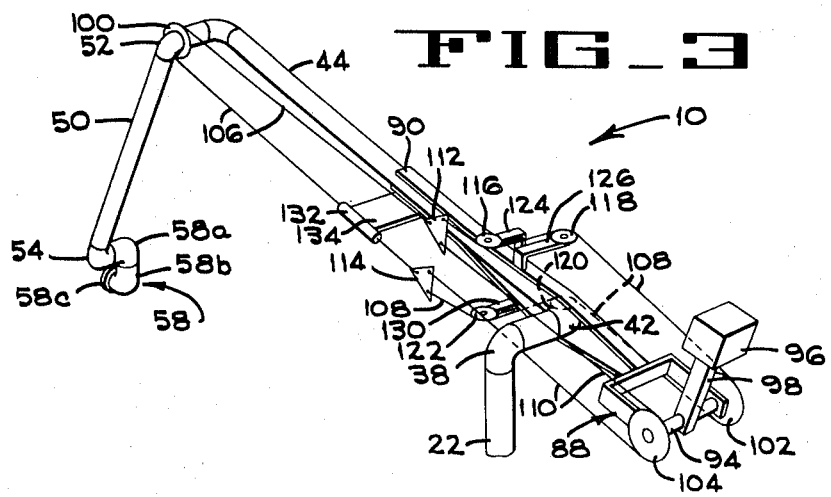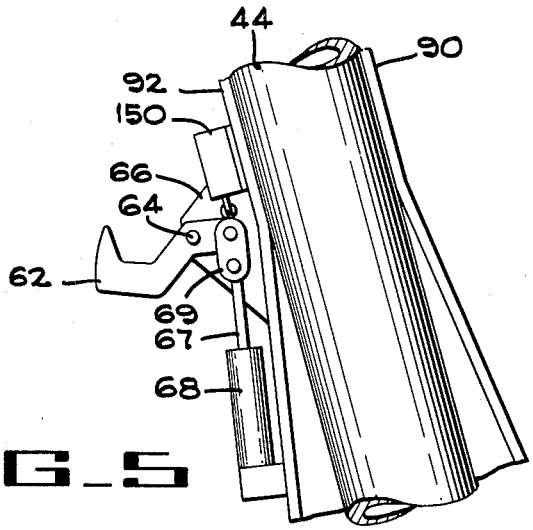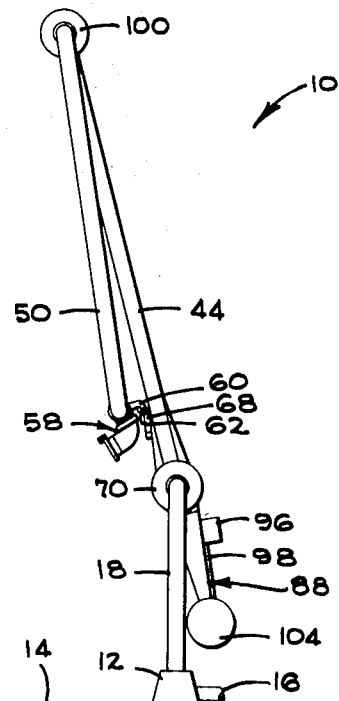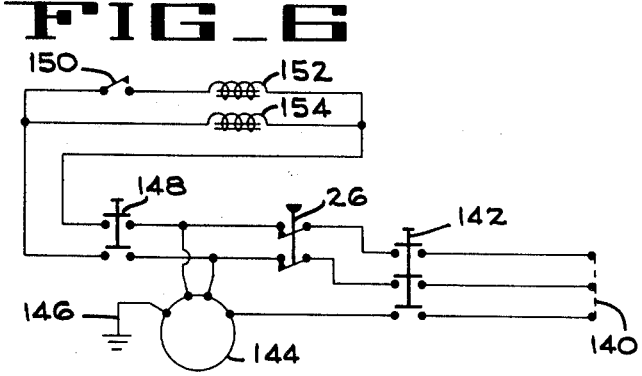

INVENTORS
FRANK HALEY
ALLAN R. BAHLKE
BY F.W. Anderson
C. C. Tripp
ATTORNEYS 3,581,769

POWERED BALANCE SYSTEM FOR A FLUID TRANSFERRING APPARATUS

BACKGROUND OF THE INVENTION

1. Field of the Invention

This invention relates to apparatus for transferring fluid between marine tankers or other floating vessels and a fluid reservoir, and more particularly to single-counterbalanced marine loading arms with powered maneuvering systems.

2. Description of the Prior Art

As is clearly evidenced in the prior art, in order to be able to maneuver loading arms of large capacity, such as those with diameters upwards of 16 inches and with reaches of 80 feet or more, weights are installed on the arms to counterbalance them about their horizontal pivotal axes. There are considerable weight differentials between an empty arm and one full of fluid, so that regardless of the condition in which the arm is balanced the resulting unbalance present in the other condition poses significant design problems. Balancing the arm when empty minimizes the counterbalance weight needed as well as the amount of power required for positioning the arm, but the weight of the unbalanced fluid when the arm is filled creates a substantial strain on the arm and the tanker's manifold, and few manifolds are designed to withstand such strains.

Some marine loading arms are overbalanced with respect to a full condition in order to eliminate this strain, but with such an arrangement a power system is needed to support the arm during the loading operation. In the event of a power failure these arms attempt to assume an upright position, and unless promptly disconnected from the manifold they can exert a of damaging magnitude on it. Furthermore, when power is employed to hold these arms in position, they then lack sufficient freedom to follow the tanker's movement unless elaborate controls are provided to reposition them in response to a stress buildup on the manifold.

SUMMARY OF THE INVENTION

This invention provides a system for simultaneously, yet separately, balancing the inboard and outboard pipe sections of a marine loading arm or other similar boom-type structure about their generally horizontal pivot axes with a single counterweight when the arm is filled with fluid. The invention also includes a power system for maneuvering the arm and the counterweight when the arm is empty, and a control system for deactivating the power system when the arm is full.

The balance system includes a counterweight mounted for pivotal movement about a horizontal axis on a yokelike support fixed to the inboard pipe section behind its horizontal pivot axis, a single outer sheave fixed to the outboard pipe section for rotation with this outboard section about its horizontal pivot axis, a pair of inner sheaves rotatably mounted on opposite sides of the yokelike support coaxial with the counterweight pivot axis, an endless-type cable system trained around the sheaves, and guide pulleys positioning the cable system so that the turning moment of the outboard pipe section is transmitted equally through each of the inner sheaves to the counterweight. The power system includes a first double-acting hydraulic cylinder to move the cable system and thus pivot the outboard pipe section and the counterweight about their horizontal pivot axes, a second double-acting hydraulic cylinder with an associated sheave and cable assembly to pivot the inboard pipe section about its horizontal pivot axis, and a third hydraulic cylinder to rotate or slew the arm about a vertical axis. The control system within the power system facilitates free movement of the arm, during fluid transfer, in response to movement of the tanker manifold to which the arm is connected.

The result is a loading arm that is fully balanced during fluid transfer and yet can follow freely the movement of a floating tanker's manifold, thereby exerting no stress or strain on the manifold, and that presents no safety hazard in the event of a power or operator failure.

BRIEF DESCRIPTION OF THE DRAWINGS

FIG. 1 is a view in side elevation of a marine loading arm embodying the present invention.

FIG. 2 is a view in rear elevation of the marine loading arm of FIG. 1.

FIG. 3 is a diagrammatic view in perspective illustrating the counterbalance system of the marine loading arm of FIGS. 1 and 2.

FIG. 4 is a diagrammatic view in side elevation showing the loading arm in a stowed position.

FIG. 5 is a view in side elevation, and on an enlarged scale, of a portion of the inboard pipe section of the loading arm showing the mechanism for latching the inboard and outboard pipe sections together when in the stowed position of FIG. 4.

FIG. 6 is a schematic diagram of an electrical circuit for use in operating the hydraulic system of FIG. 7.

DESCRIPTION OF THE PREFERRED EMBODIMENT

Figure 7:
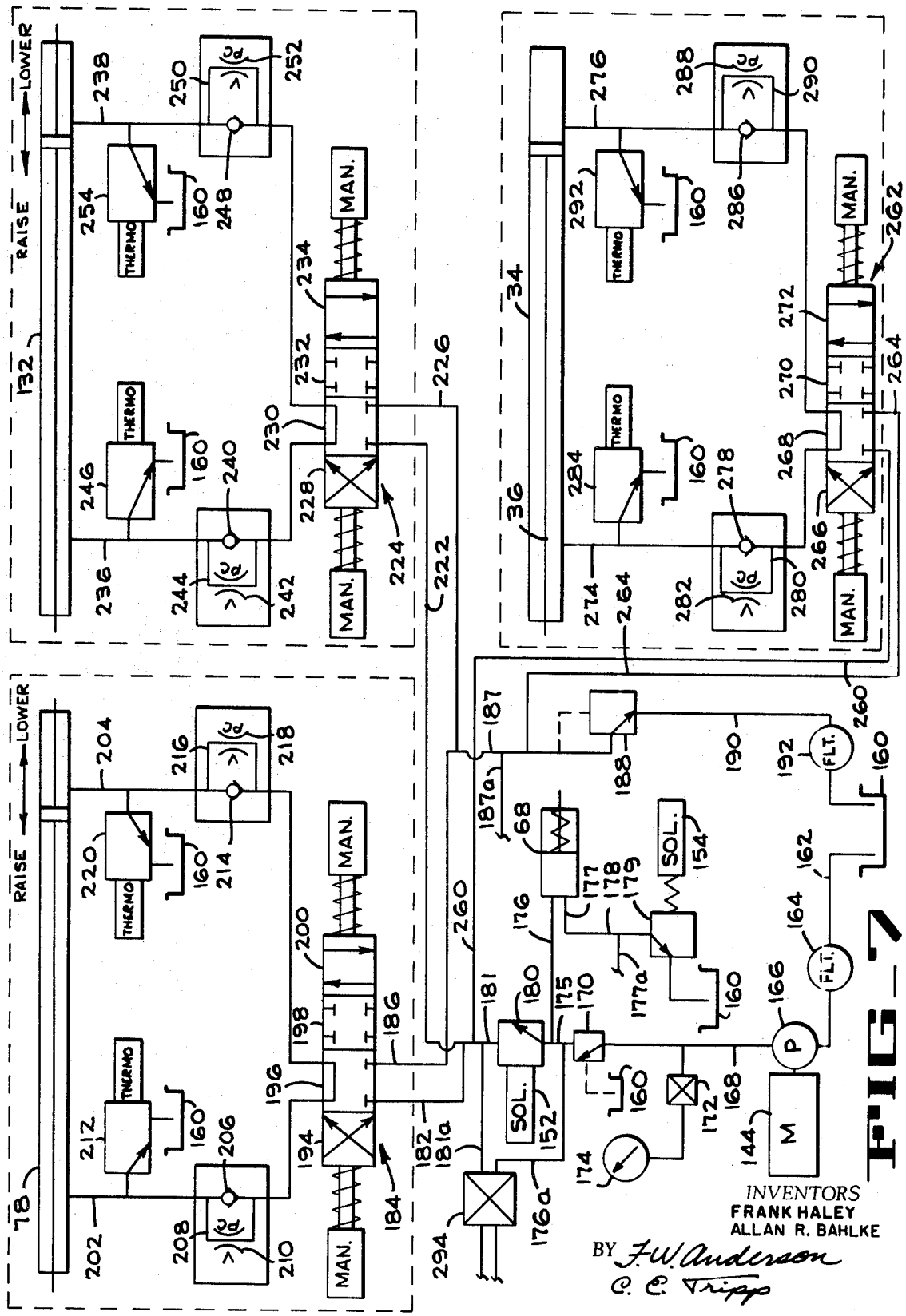
FIG. 7 is a schematic diagram of an hydraulic system by which the marine loading arm can be operated.

In reference to FIGS. 1 and 2, the marine loading arm 10 is shown mounted on a stand 12 that rests upon a wharf or other support surface 14 adjacent a berth or other mooring location for a marine tanker. A pipeline 16 connects the loading arm to a fluid reservoir or supply source (not shown), and a riser 18 extends upright therefrom. The riser 18 comprises a lower nonrotatable section 20 and an upper section 22 interconnected by a swivel pipe joint 24; thus, the upper section 22 is rotatable or slewable about a generally vertical axis A. Fixed to the side of the riser section 20 is a pressure sensing switch 26 operated by fluid pressure within the riser, as will later be described.

A first bevel gear segment 28 is fixed to, and extends outward generally horizontally from, the upper riser section 22. A second bevel gear segment 30 that meshes with the gear segment 28 is positioned in a generally vertical plane for pivotal movement about a shaft 32 that extends outward horizontally from the lower riser section 20. Attached to the stand 12 is an hydraulic cylinder 34 with a piston rod 36 pivotably connected to the second gear segment 30 at a point eccentrically spaced from the pivot shaft 32. Thus, it will be seen that actuation of the hydraulic cylinder 34 to move the piston rod 36 causes the second gear segment 30 to pivot upon its shaft 32, rotating the first gear segment 28 and the upper riser section 22 about their common vertical axis A.

The upper riser section 22 bends from the vertical axis A through a 90° elbow 38 into a horizontal attitude with an axis B (FIG. 2), and a trunnion swivel pipe joint 40 affords a rotatable connection between the riser section 22 and a 90° elbow 42 on the inner end of the arm's inboard pipe section 44. Thus, it will be seen that the rotatable upper riser section 22 and the swivel joints 24, 40 constitute means for mounting the inboard pipe section 44 for pivotal movement in both horizontal and vertical planes.

The outer end of the inboard pipe section 44 terminates in a 90° elbow 46, to which is attached a swivel pipe joint 48. An outboard pipe section 50 is connected at its inner end to the inboard pipe section 44 through a 90° elbow 52 that also is attached to the swivel joint 48. Thus, the outboard section 50 is pivotable with respect to the inboard section 44 about a generally horizontal axis C which also is parallel to the axis B.

At the outer end of the outboard pipe section 50 is another 90° elbow 54 that terminates in a swivel pipe joint 56. A conventional manifold coupling assembly 58, comprising inner and outer 90° elbows 58a, 58b, and a flanged end section 58c interconnected by swivel pipe joints 58d, 58e, is attached to the swivel joint 56 to provide a means for coupling the loading arm to a tanker manifold.

When the loading arm 10 is not in use, it can be stowed in an upright position as diagrammatically illustrated in FIG. 4. A latching mechanism, comprising a generally downwardly facing hook-shaped uplock member 60 (FIG. 1) attached to the elbow 58a, and a generally upwardly facing similarly shaped uplock member 62 (FIGS. 1 and 5) pivotally mounted via a shaft 64 on a bracket 66 fixed to the inboard pipe section 44, releasably holds the outer end of the outboard pipe section 50 to the inboard section 44. The rod 67 of an hydraulic cylinder 68 is pivotally connected through a link 69 to the uplock member 62, so that by extension or retraction of the rod 67 the uplock member 62 can be disengaged from or engaged with, respectively, the member 60.

In order to pivot the inboard pipe section 44 about the horizontal axis B, a nonrotatable sheave 70 (FIGS. 1 and 2) is mounted on the horizontal portion of the riser elbow 38, and another sheave 72 is mounted on the elbow 46 for free rotation about the axis c. A cable 74 is trained around the sheave 72, and its ends are wrapped around and fastened to the sheave 70. A turnbuckle 76, and a double-acting hydraulic cylinder 78 that is rigidly attached to the inboard pipe section 44 as by a bracket 80, are included within the cable 74, the turnbuckle providing a means for adjusting the cable tension, and the cylinder providing power to exert a pull on the cable and thereby raise or lower the arm about the axis B.

Reinforcement of the loading arm against various lateral stresses can be achieved by a diagonal tension strut 82 (FIGS. 1 and 2) pivotally connected at one end to the upper riser section 22, and at the other end to the inboard pipe section 44. Tension on the strut 82 is adjustable by a turnbuckle 84.

To counterbalance the arm about the axis B, a rearwardly extending generally yokelike support member 88 (FIG. 2) is fixed to the inboard pipe section 44, such as by a pair of beams 90, 92 (FIGS. 1 and 2). A counterweight shaft 94 is journaled within the outer end portions of the yoke legs 88a, 88b, for rotation about a generally horizontal axis D, and a counterweight 96 is supported on the shaft 94 by a beam 98. The weight of the counterweight and its spacing on the beam 98 with respect to the shaft 94 are adjustable to balance the loading arm and the fluid within the arm about the horizontal axis B.

As seen best in FIG. 3, the counterweight beam 98 is connected to the outboard pipe section 50 by a pantograph sheave-and-cable system, so that as the outboard section pivots about the axis C the beam 98 will pivot about the axis D to always remain parallel with the outboard section 50. This system comprises an outer sheave 100 fixed to the elbow 52 of the outboard pipe section 50, a pair of inner sheaves 102, 104 fixed to the opposite ends of the counterweight shaft 94, and an endless cable assembly between these sheaves. The cable assembly includes a first cable 106 trained around and attached to the sheave 100, a second cable 108 trained around and connected to the sheave 102, and a third cable 110 trained around and connected to the sheave 104. A link 112 joins the upper flight of the cable 106 to the upper flights of the cables 108, 110, while another similar link 114 joins the lower flights of these respective cables together.

A series of idler pulleys 116, 118, 120 and 122 (FIGS. 1—3) are provided to guide and support the cable 108 in its path between the cable 106 and the sheave 102. These pulleys are mounted, as by suitable brackets 124, 126, 128 and 130 respectively, on the inboard pipe section 44 and therefore pivot as a unit with the inboard pipe section about the axis B. The upper flight of the cable 108 makes a generally 90° turn about each of the pulleys 116, 118, thereby maintaining alignment with the cable 106 and the sheave 102. Similarly, the lower flight of the cable 108 makes a generally 90° turn about the pulleys 120, 122, to align with cable 106 and the sheave 102. This path thereby equalizes the cable tension on each of the sheaves 102, 104, and consequently evenly distributes the turning forces exerted by these sheaves on the counterweight shaft 94.

This cable system interconnecting the counterweight and the outboard pipe section 50 preferably is powered by a double-acting hydraulic cylinder 132 (FIG. 1) that is mounted, as by a bracket 134, on the inboard pipe section 44 and interposed in the lower flight of the cable 106. Tension adjustment on the cable 106, and hence the cables 108 and 110, is provided by means of a turnbuckle 136.

The electrical circuit illustrated in FIG. 6 is one that can be used in conjunction with the hydraulic system of FIG. 7 to operate this marine loading arm 10. Reference numeral 140 indicates a source of 220/440 volt, alternating current, single phase power with three lead wires. These lead wires are connected to a three-pole, single-throw main switch 142, and two wires from the switch are connected to the pressure sensing switch 26. The remaining wire from the main switch is connected directly to an electric motor 144, which is provided with a ground 146, and two wires returning from the pressure sensing switch 26 are also connected to the motor. A parallel circuit, extending from the wires connecting the pressure switch 26 to the motor 144 is controlled by a pushbutton switch 148. This parallel circuit includes a limit switch 150 and a first solenoid 152 that are connected in series, and a second solenoid 154 that is connected in parallel with the limit switch and first solenoid.

The hydraulic system for operating the loading arm is shown in FIG. 7. Starting from a reservoir 160, a line 162 leads through a filter 164 to an hydraulic pump 166 that is powered by the electric motor 144. A line 168 extends from the discharge side of the pump to a pressure valve 170 that is spring-biased to return flow to the reservoir 160 until the pressure in the line 168 exceeds a set amount, such as 500 pounds per square inch. A line 171 branches off the line 168 and leads through a manual shutoff valve 172 to a pressure gauge 174 for measuring the pressure within the line 168.

Hydraulic cylinder 68, which operates the uplock member 62, receives its fluid supply through a line 176 connected to the line 175 coming from the discharge side of the pressure valve 170, and an exhaust line 177 connects the cylinder to a line 178 leading into a pressure relief valve 179 that is spring-biased to normally direct flow to the reservoir 160. Under this condition, there is no pressure buildup within the hydraulic cylinder 68 to actuate the uplock member 62. When the solenoid 154 is energized it closes the valve 179, stopping fluid flow to the reservoir 160 and thereby pressurizing the cylinder 68. When the fluid pressure exceeds the pressure exerted by the cylinder's spring, the cylinder's rod extends and pivots the uplock member 62 about the shaft 64, releasing the outboard pipe section 50 and closing the limit switch 150.

The discharge line 175 from the pressure valve 170 also is connected to a valve 180 that is operated by the solenoid 152. The valve 180 is normally closed, but when the uplock member 62 is released and the limit switch 150 closes, the circuit to the solenoid 152 is completed which then opens the valve 180.

The double-acting hydraulic cylinder 78, which provides the power to maneuver the inboard pipe section 44 about the horizontal axis B, is controlled by a manually operated control valve 184 that is mounted on an operator's console 300 (FIG. 1), or other suitable location from which a person can conveniently and safely guide the arm. This control valve 184 is supplied with hydraulic fluid by a line 182 connected to a manifold-type main supply line 181 coming from the valve 180. A fluid return line 186 connects the valve 184 to a manifold-type main return line 187 that leads to a pressure-actuated return valve 188 set to direct fluid into a line 190 and through a filter 192 to the reservoir 160 when a chosen pressure, such as 50—60 p.s.i., is reached in the line 187. The control valve 184 has four controlling positions, namely, 1) a crossover 194, 2) a closed-circuit 196, 3) an all-ports-blocked 198, and 4) a direct-flow-through position 200, the functions of which will be described later.

The control valve 184 is connected to one side of the hydraulic cylinder 78 by a line 202, and to the other side of this cylinder by a line 204. Positioned within the line 202 is a check valve 206 that blocks return flow from the hydraulic cylinder 78 to the valve 184. A bypass line 208 is coupled around the check valve 206, and includes a pressure-compensated control valve 210 that permits a reverse flow in the line 202 when the pressure buildup behind the check valve 206 exceeds a set amount. An overflow valve 212 is connected to the line 202 and thermocontrolled to direct fluid to the reservoir 160 when the temperature increases to cause the fluid within the line to expand. Similarly, a check valve 214 is positioned in the line 204, and a bypass line 216 controlled by a pressure-compensated control valve 218 is coupled around this check valve. An overflow valve 220, connected to the line 204, directs flow to the reservoir 160 when the temperature increases.

Hydraulic cylinder 132, which powers the outboard pipe section 50, likewise is controlled by a manually operated control valve 224 that is mounted with the control valve 184 at a suitable location, such as console 300. A line 222 connects the control valve 224 with the manifold line 181 of the valve 180 for hydraulic fluid supply, and a fluid return line 226 extends between the valve 224 and the manifold line 187 of the return valve 188 that, as previously explained, is pressure regulated. Like the control valve 184, the valve 224 has four controlling positions defined as 1) a crossover 228, 2) a closed-circuit 230, 3) an all-ports-blocked 232, and 4) a direct flow-through position 234.

The valve 224 is connected to one side of the hydraulic cylinder 132 by a line 236, and to the other side of the cylinder by a line 238. A check valve 240 is included in the line 236, and a pressure-compensated control valve 242 is included in a bypass line 244 around the check valve 240. An overflow valve 246 is connected to the line 236 to direct fluid to the reservoir 160 in the event the fluid thermally expands. Similarly, the line 238 includes a check valve 248 with a bypass line 250 regulated by a pressure-compensated control valve 252. An overflow valve 254 directs fluid from the line 238 to the reservoir 160 when thermal conditions cause expansion of the fluid.

The hydraulic cylinder 34, which powers the loading arm 10 in its pivotal movement about the vertical axis A, is controlled in the same manner as the cylinders 78 and 132 by a manually operated control valve 262 that is also mounted at a suitable location, such as console 300, along with the valves 184, 224. A line 260 connects the control valve 262 with the manifold line 181 of the valve 180 to provide a fluid supply, and a fluid return line 264 connects this control valve with the manifold line 187 of the valve 188 for returning fluid to the reservoir 160. The four controlling positions of the valve 262 are 1) a crossover 266, 2) a closed-circuit 268, 3) an all-ports-blocked 270, and 4) a direct-flow-through position 272. A line 274 connects the valve 262 with one side of the hydraulic cylinder 34, while another line 276 connects the valve to the opposite side of the cylinder. A check valve 278 is included in the line 274, and a bypass line 280 with a pressure-compensated control valve 282 is positioned about the check valve 278. An overflow valve 284 also is connected to the line 274 for releasing fluid to the reservoir 160 if the fluid undergoes thermal expansion. Similarly, a check valve 286 is provided in the line 276, and a pressure-compensated control valve 288 regulates a bypass line 290 thereabout. An overflow valve 292 is connected to the line 276 providing for release of fluid to the reservoir 160 if the fluid thermally expands.

It should be understood that although the foregoing describes a system for operating a single loading arm, a plurality of arms can be operated with this system by providing for each additional arm a separate subsystem comprising the elements 68, 176, 177, 182—186, and 194—292, and connecting each such subsystem via lines 176a, 177a, 181a, and 187a into the lines 175, 178, 181 and 187 in parallel with its counterpart of FIG. 7. A manual double-port shutoff valve 294 is preferably included with each subsystem in the lines 176a, 181a connecting to the fluid supply lines 175 and 181, to facilitate selective operation of the arms.

In operation, the marine loading arm 10 is stowed in an upright position (FIG. 4) with the outboard pipe section 50 held to the inboard pipe section 44 by the uplock members 60 and 62. The counterweight 96 overbalances the empty arm and thereby maintains it in this upright position. Closing the main switch 142 when the pressure sensing switch 26 is closed, sends power to the electric motor 144 which drives the pump 166. When the line pressure behind the valve 170 builds up to exceed its setting, such as 500 pounds per square inch, it opens and allows fluid to pass through the hydraulic cylinder 68 and return through the valve 179 to the reservoir 160.

Closing the pushbutton switch 148 sends power to the solenoid 154 which closes the valve 179. As pressure builds up within the hydraulic cylinder 68, the cylinder's piston rod extends and pivots the uplock member 62 on the shaft 64, and closes the limit switch 150, thereby releasing the member 60 and the outboard pipe section 50, and energizing the solenoid 152 which then opens the valve 180. This allows fluid to flow through the line 182 to the control valve 184, and simultaneously through the lines 222 and 260 to the control valves 224, 262, respectively. At this point, the arm is ready for maneuvering into position for coupling to a tanker manifold or the like.

As viewed in FIG. 7, with the left end of the cylinder 78 oriented towards the sheave 72, i.e., the outer end of the inboard pipe section 44, placing the direct-flow-through position 200 of the control valve 184 in registration with the lines 182, 186 will admit fluid through line 202 into the left side of the cylinder, pivoting the inboard pipe section downwardly about the axis B from the stowed position of FIG. 4, and of course placing the valve's crossover position 194 in registration with the lines 182, 186 will raise this inboard section about the same axis. With the cylinder 132 mounted on the arm with its left end, as viewed in FIG. 7, also oriented toward the outer end of the inboard pipe section 44, i.e., towards the sheave 100, admitting fluid into line 236 by placing the direct-flow-through position 234 of the control valve 224 in registration with the lines 222, 226 will raise the outboard arm section 50 about the axis C, and registering the crossover position 228 with the lines 222, 226 will lower the outboard section or pivot it counterclockwise, as viewed in FIG. 1, about this axis. Retracting the piston rod 36 of the cylinder 34 by inletting fluid into line 274, achieved by placing the direct-flow-through position 272 of the control valve 262 in registry with the lines 260, 264, will pivot the arm 10 clockwise about the axis A as viewed from above, i.e., swing the arm away from the viewer looking at FIG. 1, and extending the piston rod 36 by aligning the valve's crossover position 266 with the lines 260, 264, thereby reversing the flow into the cylinder 34, will pivot the arm 10 in the opposite direction. The all-ports-blocked positions 198, 232 and 270 of these valves are, of course, for holding the cylinder's rods, and hence the pipe sections or elements to which they are connected, stationary. Accordingly, by manipulation of the control valves 184, 224, 262 between their several positions, the arm can be easily maneuvered into position for connecting the coupling assembly 58 to the tanker's manifold or the like.

Once this connection is completed, the control valves are released and permitted to return to their spring-biased normal position shown in FIG. 7, i.e., wherein the closed-circuit positions 196, 230 and 268 are in registry with the inlet lines 182, 222, 260 and the exhaust lines 186, 226, 264, respectively, thereby allowing the fluid to pass freely in and out of the cylinders 78, 132, 34 and establishing a "free-wheeling" condition in the arm so that it can follow the movements of the tanker without restriction. For example, if pressure builds up in the line 202 of the cylinder 78, such as if the piston is subjected to a force inclined to move it to the left (FIG. 7), the pressure-compensated valve 210 will open and allow hydraulic fluid to flow through the closed-circuit position 196 of the valve 184 into the line 204 and through the check valve 214 into the cylinder's other end. Thus, since each of the cylinders 78, 132, 34 are free to move in response to external forces, and since the arm 10, together with the transferring fluid it contains when filled, is balanced by the counterweight 96, the arm will float freely with the tanker's manifold.

As fluid is admitted to the arm for transfer, it exerts a pressure within the lower riser section 20, causing the pressure-sensing switch 26 to open and break the circuit to the electric motor 144. This stops the hydraulic pump 166, so that the arm cannot be maneuvered by the hydraulic power system accidentally or inadvertently while fluid is being transferred.

When fluid transfer has been completed, the all-ports-blocked position 198 of the control valve 184 is placed in registry with the lines 182, 186, thereby blocking circulation of hydraulic fluid between the lines 202, 204, and preventing movement of the piston and rod in the cylinder 78. Likewise, the all-ports-blocked position 232 of the control valve 224 is registered with the lines 222, 226 to block fluid circulation between the lines 236, 238 and thereby prevent movement of the piston and rod in the cylinder 132. With the cylinders 78, 132 maintaining the inboard and outboard pipe sections 44, 50 in their respective positions, thus preventing the arm when partially or totally empty from exerting a lifting strain on the tanker's manifold due to the overbalancing effect of the counterweight 96, the arm is drained of all fluid being transferred and the coupling assembly 58 is uncoupled from the manifold.

As the fluid drains from the lower riser section 20, pressure sensing switch 26 closes, reestablishing the circuit to the electric motor 144. This starts the motor and the hydraulic fluid pump 166, thereby providing operating pressure in the line 181. The arm is then maneuvered by manipulation of the control valves 184, 224, 262 back into its upright stowed position shown in FIG. 4, and the valves' all-ports-blocked positions 198, 232, 270 then placed in registration with their respective hydraulic lines to hold the arm in this stowed position. The switch 148 is opened to deenergize the solenoids 152, 154, thus closing the valve 180 and allowing the valve 179 to open and release fluid from the cylinder 68 to the reservoir 160. The piston rod in the cylinder 68 is then retracted by the cylinder's spring, pivoting the uplock member 62 on its shaft 64 into locking engagement with the uplock member 60. This locks the outboard arm 50 to the inboard arm 44, and also opens limit switch 150 to assure that the arm cannot be maneuvered while in the stowed and locked condition.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, We claim:

1. A fluid transferring apparatus comprising:
   a. an inboard pipe section;
   b. means mounting said inboard pipe section for pivotal movement about a first substantially horizontal axis;
   c. an outboard pipe section connected to said inboard pipe section for pivotal movement about a second substantially horizontal axis;
   d. counterbalancing means connected to the inboard pipe section at a given point for pivotal movement about a third substantially horizontal axis;
   e. means connecting said counterbalancing means with said outboard pipe section for movement of said counterbalancing means about said third axis on pivotal movement of said outboard pipe section about said second axis;
   f. power means for simultaneously moving said outboard pipe section about said second axis and said counterbalancing means about said third axis whereby said outboard pipe section is balanced when filled with a fluid;
   g. control means for regulating said power means to prevent operation thereof when said pipe sections are filled with fluid, while also facilitating movement of said connecting means in response to movement of said outboard pipe section, said control means including means for sensing the presence of fluid in said transferring apparatus, and means interconnecting said sensing means and said power means, whereby the presence of fluid in said apparatus actuates said sensing means to prevent operation of said power means.

2. A fluid transferring apparatus comprising:
   a. an inboard pipe section;
   b. means mounting said inboard pipe section for pivotal movement about a first substantially horizontal axis;
   c. an outboard pipe section connected to said inboard pipe section for pivotal movement about a second substantially horizontal axis;
   d. counterbalancing means connected to the inboard pipe section at a given point for pivotal movement about a third substantially horizontal axis;
   e. means connecting said counterbalancing means with said outboard pipe section for movement of said counterbalancing means about said third axis on pivotal movement of said outboard pipe section about said second axis;
   f. first power means for simultaneously moving said outboard pipe section about said second axis and said counterbalancing means about said third axis whereby said outboard pipe section is balanced when filled with fluid;
   g. control means for regulating said first power means to prevent operation thereof when said pipe sections are filled with fluid, while also facilitating movement of said connecting means in response to movement of said outboard pipe section; and
   h. second power means for pivoting said inboard pipe section about said first axis, said second power means being regulated by said control means to prevent operation of said second power means when said pipe sections are filled with fluid, while also facilitating movement of said inner pipe section in response to movement of said outboard pipe section.

3. A fluid transferring apparatus comprising:
   a. an inboard pipe section;
   b. means mounting said inboard pipe section for pivotal movement about a first substantially horizontal axis;
   c. means mounting said inboard pipe section for pivotal movement about a substantially vertical axis;
   d. an outboard pipe section connected to said inboard pipe section for pivotal movement about a second substantially horizontal axis;
   e. counterbalancing means connected to the inboard pipe section at a given point for pivotal movement about a third substantially horizontal axis;
   f. means connecting said counterbalancing means with said outboard pipe section for movement of said counterbalancing means about said third axis on pivotal movement of said outboard pipe section about said second axis;
   g. first power means for simultaneously moving said outboard pipe section about said second axis and said counterbalancing means about said third axis whereby said outboard pipe section is balanced when filled with fluid;
   h. control means for regulating said first power means to prevent operation thereof when said pipe sections are filled with fluid, while also facilitating movement of said connecting means in response to movement of said outboard pipe section; and
   i. third power means for pivoting said inboard pipe section about said vertical axis, said third power means being regulated by said control means to prevent operation of said third power means when said pipe sections are filled with fluid, while also facilitating horizontal movement of said pipe sections in response to movement of said outboard pipe section.

4. A fluid transferring apparatus as defined in claim 3, including second power means for pivoting said inboard pipe section about said first axis, said second power means being regulated by said control means to prevent operation of said second power means when said pipe sections are filled with fluid, while also facilitating movement of said inboard pipe section in response to movement of said outboard pipe section.

5. A fluid transferring apparatus comprising:
   a. an inboard pipe section;
   b. means mounting said inboard pipe section for pivotal movement about a first substantially horizontal axis;

c. an outboard pipe section connected to said inboard pipe section for pivotal movement about a second substantially horizontal axis;

d. counterbalancing means connected to the inboard pipe section at a given point for pivotal movement about a third substantially horizontal axis, said counterbalancing means including a weighted arm, a shaft fixed to said arm and rotatably mounted at the end of said inboard pipe section opposite the end to which said outboard pipe section is connected, a first sheave fixed to the shaft on one side of the weighted arm, and a second sheave fixed to the shaft on the opposite side of the weighted arm;

e. means connecting said counterbalancing means with said outboard pipe section for movement of said counterbalancing means about said third axis on pivotal movement of said outboard pipe section about said second axis, said means connecting said counterbalancing means with said outboard pipe section including a sheave fixed to said outboard pipe section, a first cable trained about said outboard pipe section sheave, a second cable trained about said first sheave and connected at each end to corresponding ends of said first cable, a third cable trained about said second sheave and connected at each end to corresponding ends of said first cable, and pulley guide means for aligning said third cable to exert a force on said second sheave that is equal and parallel to the force exerted by said second cable on said first sheave;

f. power means for simultaneously moving said outboard pipe section about said second axis and said counterbalancing means about said third axis whereby said outboard pipe section is balanced when filled with fluid; and g. control means for regulating said power means to prevent operation thereof when said pipe sections are filled with fluid, while also facilitating movement of said connecting means in response to movement of said outboard pipe section.

6. A fluid transferring apparatus as defined in claim 5, wherein said power means include a double-acting hydraulic cylinder linked with said first cable.

7. A fluid transferring apparatus as defined in claim 6, including second power means for pivoting said inboard pipe section about said first axis, said second power means being regulated by said control means to prevent operation of said second power means when said pipe sections are filled with fluid, while also facilitating movement of said inner pipe section in response to movement of said outboard pipe section.

8. A fluid transferring apparatus as defined in claim 6, including means mounting said inboard pipe section for pivotal movement about a substantially vertical axis, and third power means for pivoting said inboard pipe section about said vertical axis, said third power means being regulated by said control means to prevent operation of said third power means when said pipe sections are filled with fluid, while also facilitating horizontal movement of said pipe sections in response to movement of said outboard pipe section.

9. A fluid transferring apparatus as defined in claim 8, including second power means for pivoting said inboard pipe section about said first axis, said second power means being regulated by said control means to prevent operation of said second power means when said pipe sections are filled with fluid, while also facilitating movement of said inboard pipe section in response to movement of said outboard pipe section.

10. A fluid transferring apparatus comprising:

a. an inboard pipe section;

b. means mounting said inboard pipe section for pivotal movement about a first substantially horizontal axis;

c. an outboard pipe section connected to said inboard pipe section for pivotal movement about a second substantially horizontal axis;

d. counterbalancing means connected to the inboard pipe section at a given point for pivotal movement about a third substantially horizontal axis;

e. means connecting said counterbalancing means with said outboard pipe section for movement of said counterbalancing means about said third axis on pivotal movement of said outboard pipe section about said second axis;

f. power means for simultaneously moving said outboard pipe section about said second axis and said counterbalancing means about said third axis whereby said outboard pipe section is balanced when filled with fluid;

g. control means for regulating said power means to prevent operation thereof when said pipe sections are filled with fluid, while also facilitating movement of said connecting means in response to movement of said outboard pipe section;

h. means for releasably locking said outboard pipe section to said inboard pipe section to prevent pivotal movement of said outboard pipe section about said second axis; and i. means for preventing operation of said power means when said outboard pipe section is releasably locked to said inboard pipe section.

11. A fluid transferring apparatus as defined in claim 10, wherein said locking means is powered by an hydraulic cylinder, and said power operation preventing means is associated with and actuatable by said locking means.